Patented Feb. 2, 1932

1,843,705

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

PREPARATION OF AMINE HYDROHALIDES

No Drawing.  Application filed September 14, 1929.  Serial No. 392,728.

The present invention concerns the manufacture of amine hydrohalides, particularly aromatic amine hydrohalides, and more particularly with methods for the manufacture of aniline hydrochloride.

Heretofore the production of amine hydrohalides usually has been carried out according to some method employing a solvent. For instance, industry has largely used the so-called aqueous method, whereby aniline is reacted with aqueous hydrochloric acid. However, such method necessitates several operative steps such as crystallizations, concentrations, evaporations, separations of crystals, dryings, and poison-hazard. Moreover, the product, e. g. aniline hydrochloride, when prepared by aqueous method, is usually discolored or so becomes on standing, and the product yield is lowered by losses in the just mentioned multiplicity of operative steps.

A convenient and well known laboratory method for the preparation of such hydrohalides makes use of organic solvents, wherein a gaseous hydrogen halide is passed into a solution of an amine dissolved in such organic solvent, the amine salt being precipitated in solid crystalline form. For instance, Hoffman (Lassar Cohn; Arbeits Methoden, 4th Ed., 1907, Spl. part, pg. 127; Leopold Voss Pub.) passed hydrochloric acid gas into an ether solution of ethyl aniline, thereby obtaining crystals of the corresponding hydrochloride. Ullman (Ber. 31—1699; 1898) prepared hydrochlorides of aniline, the toluidines, and xylidines, by conducting the said acid gas into the respective amines dissolved in carbon tetrachloride. Lassar Cohn (loc. cit.) has stated that in all such cases, ether can be replaced by benzene, etc. The latter method has attendant disadvantages, such as fire and/or health hazard and the necessity for solvent evaporation and recovery.

In a pending application by Lindley E. Mills, Serial No. 392,726, filed September 14, 1929, a method for the preparation of amine hydrohalides is described whereby a gaseous hydrogen halide is reacted with an amine in the liquid state, in the absence of a solvent or solvent vapors, at a temperature sufficient to maintain the reaction mixture in fluid condition, the product being obtained as a liquid preliminarily to solidification thereof.

I have now found that amine hydrohalides, e. g. aniline hydrochloride, may be prepared by reacting between a gaseous hydrogen halide and an amine in liquid state, also in absence of a solvent or solvent vapors, but at a temperature below the melting point of the amine hydrochloride product.

Among the objects of the present invention are the elimination of the above mentioned disadvantages and the preparation of a pure product by a simplified procedure. Other objects and advantages will become apparent as the description proceeds.

To the accomplishment of the foregoing and related ends, the invention, then, consists of the method hereinafter fully described and particularly pointed out in the claims, the following description setting forth in detail several modes of carrying out the invention, such disclosed modes illustrating, however, but several of the various ways in which the principle of the invention may be used.

By way of illustration, I shall describe the improved method as applied to the manufacture of aniline hydrochloride. Aniline is placed in a tumbler, or dough mixer type of apparatus, or other device adapted for grinding solid material in a closed space, such as a ball mill or similarly equipped grinding apparatus and constructed of materials unreactive with the reacting substances. Gaseous hydrogen chloride is then admitted to such reaction chamber. As the acid is absorbed by the aniline to yield aniline hydrochloride, the initially liquid reaction mass becomes thicker and thicker and eventually becomes completely solid. Said reaction mass may be stirred and broken up continuously or discontinuously, by rotation of the reactor or in other manner in order continually to expose unreacted aniline to the gaseous acid. Eventually the aniline is completely reacted and aniline hydrochloride remains as a dry, powdered product in the reactor.

The process is operated at a temperature below the fusion point of the reaction mixture or product. However, the higher the temperature used, the higher will be the content of aniline hydrochloride before complete solidification of the reaction mixture occurs. The process may be adapted to continuous operation such as by continual addition of reactants, recycling any excess gaseous hydrogen chloride and by continuous removal of product such as by means of a screw discharge of the latter from the reactor.

Furthermore, the process may be carried out under either reduced or increased pressure, if desired.

The following detailed examples are given to illustrate my improved method, but it is understood that such examples are not to be interpreted as a limitation upon the invention.

*Example 1.*—432 grams of aniline was placed in a jacketed mixing machine, and substantially dry hydrogen chloride gas passed into such apparatus above the liquid level. Absorption of the acid gas by the amine occurred rapidly at first, and then more slowly. Mixing was continued until all the aniline was converted into the corresponding hydrochloride. The temperature was maintained at 0° to 10° C. by means of circulating ice water thru the jacket. The yield of pure aniline hydrochloride (M. P. 198° C.) was practically theoretical.

*Example 2.*—O-toluidine hydrochloride was prepared from 361 grams of the corresponding amine, in a manner as described in the above example. The temperature during the reaction was maintained below 30° C. The yield of product (M. P. 214° C.) was substantially theoretical.

I do not limit my invention to the reaction components specifically mentioned in the above examples. Other equivalent amines may be employed, e. g. primary, secondary, or tertiary alkyl amines, or aromatic amines such as anilines in which the ring and/or the nitrogen may be substituted by one or more alkyl groups. Accordingly, the temperature of the reaction may be varied, depending upon the particular amine being reacted.

Under proper control, the manipulative steps and handling of materials may be limited to the charging of the materials and the removal of product in dry form from the reactor. By operating in the herein described manner, the product is pure, dry, white, powdered, requires no further purification, and is obtained in substantially quantitative yields.

Other advantages of my improved method are, (1) lower temperature of reaction, thus avoiding danger of contamination as by air oxidation, (2) either continuous or batch operation is possible, and (3) the material comes from the reactor without necessitating breaking up or drying.

In résumé, my invention involves reacting between a gaseous hydrogen halide and a liquid amine at a temperature below the fusion point of the corresponding amine hydrohalide, under substantially anhydrous conditions, and in the absence of a solvent or solvent vapors.

Other modes of applying the principle of my invention may be employed instead of the ones explained, change being made as regards the process herein disclosed, provided the step or steps stated by any of the following claims or the equivalent of such stated step or steps be employed.

I therefore particularly point out and distinctly claim as my invention:—

1. The method of making an amine hydrohalide, which comprises reacting between an amine in the liquid state and a gaseous hydrogen halide at a temperature below the fusion point of the product, and in the absence of a solvent.

2. The method of making an aromatic amine hydrohalide, which comprises reacting between an aromatic amine in the liquid state and a gaseous hydrogen halide at a temperature below the fusion point of the product, and in the absence of a solvent.

3. The method of making an aniline hydrohalide, which comprises reacting between aniline in the liquid state and a gaseous hydrogen halide at a temperature below the fusion point of the product, and in the absence of a solvent.

4. The method of making aniline hydrochloride, which comprises reacting between aniline in the liquid state and gaseous hydrogen chloride at a temperature below the fusion point of the product, and in the absence of a solvent.

5. The method of making an amine hydrohalide, which comprises progressively contacting a gaseous hydrogen halide with an amine in the liquid state, under substantially anhydrous conditions, in the absence of a solvent, and at a temperature below the fusion point of the product, the reaction mixture gradually changing from a liquid basic material to a solid salt.

6. The method of making an aromatic amine hydrohalide, which comprises progressively contacting a gaseous hydrogen halide with an aromatic amine in the liquid state, under substantially anhydrous conditions, in the absence of a solvent, and at a temperature below the fusion point of the product, the reaction mixture gradually changing from a liquid basic material to a solid salt.

7. The method of making an aniline hydrohalide, which comprises progressively contacting a gaseous hydrogen halide with aniline in the liquid state, under substantially anhydrous conditions, in the absence of a solvent, and at a temperature below the fusion point of the product, the reaction mixture gradually changing from a liquid basic material to a solid salt.

8. The method of making aniline hydrochloride, which comprises progressively contacting gaseous hydrogen chloride with aniline in the liquid state, under substantially anhydrous conditions, in the absence of a solvent, and at a temperature below the fusion point of the product, the reaction mixture gradually changing from a liquid basic material to a solid salt.

9. The method of making an amine hydrohalide, which comprises reacting between a gaseous hydrogen halide and an amine in the liquid state, and continually exposing the unreacted amine to such gas as the reaction proceeds by mechanical agitation, such steps being performed in absence of a solvent and at a temperature below the fusion point of the product.

10. The method of making an aromatic amine hydrohalide, which comprises reacting between a gaseous hydrogen halide and an aromatic amine in the liquid state, and continually exposing the unreacted amine to such gas as the reaction proceeds by mechanical agitation, such steps being performed in absence of a solvent and at a temperature below the fusion point of the product.

11. The method of making an aniline hydrohalide, which comprises reacting between a gaseous hydrogen halide and aniline in the liquid state, and continually exposing the unreacted amine to such gas as the reaction proceeds by mechanical agitation, such steps being performed in absence of a solvent and at a temperature below the fusion point of the product.

12. The method of making aniline hydrochloride, which comprises reacting between gaseous hydrogen chloride and aniline in the liquid state, and continually exposing the unreacted amine to such gas as the reaction proceeds by mechanical agitation, such steps being performed in absence of a solvent and at a temperature below the fusion point of the product.

13. The method of making aniline hydrochloride, which comprises reacting between gaseous hydrogen chloride and aniline, exposing the unreacted latter to such gas as the reaction proceeds, and recycling such unused gas, the steps being performed in the absence of a solvent and at a temperature below approximately 200° C.

14. In a method of making an amine hydrohalide by reacting an amine in the liquid state with a gaseous hydrogen halide, the step of progressively adding the latter to the reaction mixture while unreacted amine in the reaction mixture is being progressively exposed to the action of such gaseous halide, at a temperature below the fusion point of the product.

15. In a method of making an aromatic amine hydrohalide by reacting an aromatic amine in the liquid state with a gaseous hydrogen halide, the step of progressively adding the latter to the reaction mixture while unreacted amine in the reaction mixture is being progressively exposed to the action of such gaseous halide, at a temperature below the fusion point of the product.

16. In a method of making an aniline hydrohalide by reacting aniline in the liquid state with a gaseous hydrogen halide, the step of progressively adding the latter to the reaction mixture while unreacted aniline in the reaction mixture is being progressively exposed to the action of such gaseous halide, at a temperature below the fusion point of the product.

17. In a method of making aniline hydrochloride by reacting aniline in the liquid state with a gaseous hydrogen chloride, the step of progressively adding the latter to the reaction mixture while unreacted aniline in the reaction mixture is being progressively exposed to the action of hydrogen chloride, at a temperature below the fusion point of the product.

Signed by me this 11th day of September, 1929.

EDGAR C. BRITTON.